(12) United States Patent
Subrata et al.

(10) Patent No.: US 7,728,541 B2
(45) Date of Patent: Jun. 1, 2010

(54) ELECTRIC MOTOR DRIVE CONTROL METHOD AND APPARATUS

(75) Inventors: Saha Subrata, Anjo (JP); Zhigian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 354 days.

(21) Appl. No.: 11/889,281

(22) Filed: Aug. 10, 2007

(65) Prior Publication Data

US 2008/0042605 A1 Feb. 21, 2008

(30) Foreign Application Priority Data

Aug. 17, 2006 (JP) .............................. 2006-222239

(51) Int. Cl.
*H02P 21/00* (2006.01)
(52) U.S. Cl. ....................... 318/449; 318/461
(58) Field of Classification Search ................. 318/449, 318/461
See application file for complete search history.

(56) References Cited

U.S. PATENT DOCUMENTS

| | | | | |
|---|---|---|---|---|
| 5,309,075 | A * | 5/1994 | Yokoe et al. | 318/608 |
| 6,329,781 | B1 * | 12/2001 | Matsui et al. | 318/717 |
| 6,392,418 | B1 * | 5/2002 | Mir et al. | 324/503 |
| 6,549,871 | B1 * | 4/2003 | Mir et al. | 702/145 |
| 7,005,828 | B2 * | 2/2006 | Karikomi | 318/801 |
| 7,042,227 | B2 * | 5/2006 | Mir et al. | 324/503 |
| 7,049,782 | B2 | 5/2006 | Chen et al. | |
| 7,379,797 | B2 * | 5/2008 | Nasr et al. | 701/22 |
| 2003/0173921 | A1 | 9/2003 | Nakazawa | |
| 2005/0285555 | A1 | 12/2005 | Chen et al. | |

FOREIGN PATENT DOCUMENTS

| | | |
|---|---|---|
| JP | A-06-245314 | 9/1994 |
| JP | A-2003-274699 | 9/2003 |
| JP | A-2005-192341 | 7/2005 |
| JP | A-2006-14539 | 1/2006 |
| JP | A-2006-014539 | 1/2006 |

\* cited by examiner

*Primary Examiner*—Bentsu Ro
*Assistant Examiner*—David S Luo
(74) *Attorney, Agent, or Firm*—Oliff & Berridge, PLC

(57) ABSTRACT

An electric motor drive control method includes deriving a target current from a target torque to apply electric current corresponding to the target current to an electric motor. When a rotation speed of the motor is in a predetermined speed region, including a zero rotation speed at which the target current for driving the motor allocated to the target torque is switched discontinuously, the target current corresponding to the rotation speed is obtained through a linear interpolation using the rotation speed and target currents at a traction side and a regeneration side allocated to the target torque such that the electric current corresponding to the target current is applied to the motor.

16 Claims, 16 Drawing Sheets

FIG. 14A
FIG. 14B
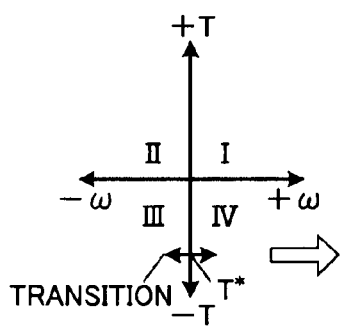
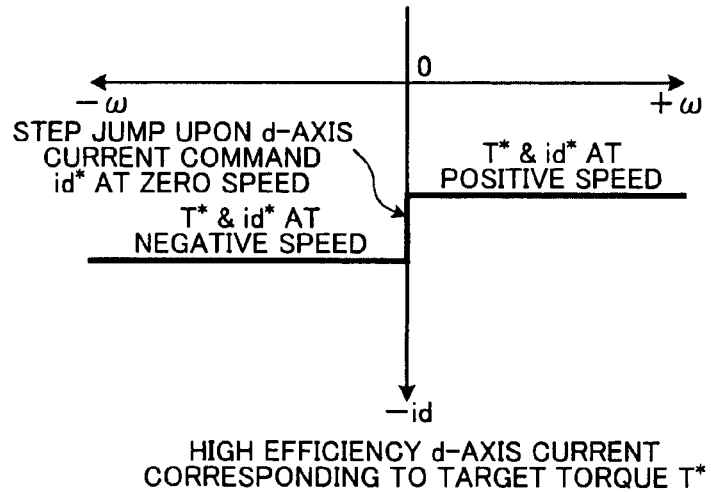
HIGH EFFICIENCY d-AXIS CURRENT
CORRESPONDING TO TARGET TORQUE T*

FIG. 16A
FIG. 16B
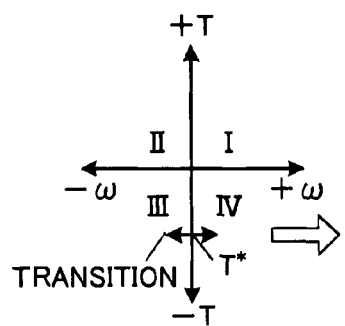
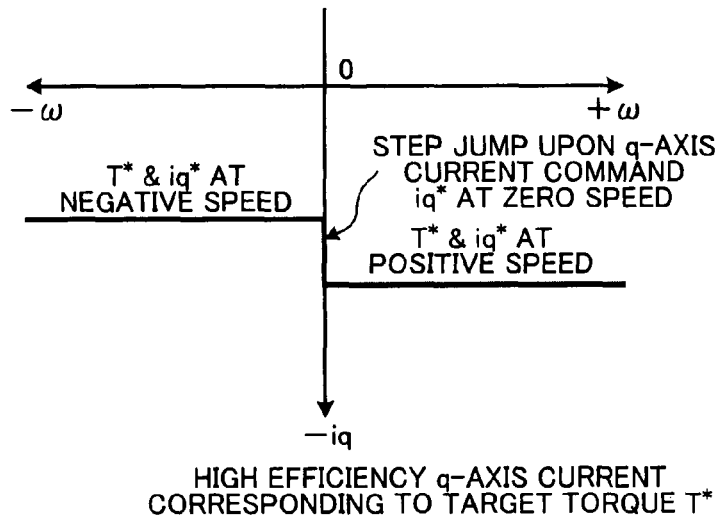

ELECTRIC MOTOR DRIVE CONTROL METHOD AND APPARATUS

INCORPORATION BY REFERENCE

The disclosure of Japanese Patent Application No. 2006-222239 filed on Aug. 17, 2006 including the specification, drawings and abstract is incorporated herein by reference in its entirety.

BACKGROUND

The present invention relates to an electric motor drive control method and apparatus.

An electric motor serves to drive a vehicle (traction) and apply a braking force to the vehicle (regeneration). Development of the vector control technique has allowed various types of electric motor control to be smoothly performed with precision. Recently, a three-phase AC motor such as a three-phase induction motor, a permanent magnet synchronous motor and the like has been employed to control the motor under a vector control. Japanese Patent Application Publication No. JP-A-2005-192341 discloses a permanent magnet synchronous motor structured to be mounted on a hybrid vehicle. Japanese Patent Application Publication No. JP-A-2006-14539 discloses a mode of the vector control with respect to the electric motor of the aforementioned type.

The permanent magnet synchronous motor is provided with a rotor equipped with a permanent magnet and a stator equipped with stator coils at a U-phase, V-phase and W-phase. In Japanese Patent Application Publication No. JP-A-2006-14539, the electric motor is connected to a drive control unit for the purpose of generating a drive motor torque serving as a torque of the drive motor or a generator torque serving as a torque of the generator. The control unit transmits pulse width modulation signals (PWM pulse) at the U-phase, V-phase and W-phase to an inverter. The inverter supplies the phase current, that is, the electric current at the U-phase, V-phase and W-phase to the respective stator coils so as to generate the drive motor torque and the generator torque.

SUMMARY

The drive control unit executes a feedback control by performing a vector control calculation on a d-q axis model where the d-axis is set to represent the direction of a pair of poles the rotor, and the q-axis is set to be orthogonal to the d-axis. More specifically, the electric current applied to the respective stator coils, the magnetic pole position of the rotor, the DC voltage (power source voltage) at the inlet of the inverter, and the like are detected, and the detected three-phase electric current is subjected to three-phase/two-phase conversion into the d-axis/q-axis current based on the magnetic pole position. Meanwhile, the d-axis target electric current and the q-axis target electric current corresponding to the target torque values are read in reference to the torque/current conversion table so as to calculate the deviation of the d-axis conversion current from the d-axis target electric current, and the deviation of the q-axis conversion current from the q-axis target current. Then the d-axis target voltage and the q-axis target voltage are calculated for bringing the respective deviations to zero. The calculated values are subjected to the two-phase/three-phase conversion to set the voltage command values at the U-phase, V-phase and W-phase. The PWM pulse may be generated based on the respective voltage command values.

When the vehicle is electrically driven to travel, quadrant transition from traction to regeneration or vice versa may be observed in response to the same torque command in the specific traveling state, for example, "hill climbing" operation of the vehicle. During the quadrant transition between the traction and regeneration in response to the same torque command, the step jump of the d-axis and q-axis current commands may occur, resulting in torque shock.

The invention allows, for example, smooth transition of the quadrant transition between traction and regeneration upon the current command. The invention also, for example, prevents or suppresses the torque shock of the electric motor caused by the quadrant transition. The invention also, for example, realizes the aforementioned prevention or suppression in a relatively easy manner. The invention also, for example, drives a low power consumption type electric motor with high efficiency. The invention also, for example, suppresses a reduction in the output torque at high speeds.

An exemplary aspect of the invention includes an electric motor drive control method that includes deriving a target current from a target torque to apply electric current corresponding to the target current to an electric motor. When a rotation speed of the motor is in a predetermined speed region, including a zero rotation speed at which the target current for driving the motor allocated to the target torque is switched discontinuously, the target current corresponding to the rotation speed is obtained through a linear interpolation using the rotation speed and target currents at a traction side and a regeneration side allocated to the target torque such that the electric current corresponding to the target current is applied to the motor.

An exemplary aspect of the invention includes an electric motor drive control method that includes deriving d-axis and q-axis target currents from a target torque to apply electric current corresponding to the target currents to an electric motor. When a rotation speed of the motor is in a predetermined speed region including a zero rotation speed at which the target current for driving the motor allocated to the target torque is switched discontinuously, the d-axis target current corresponding to the rotation speed is obtained through a linear interpolation using the rotation speed and d-axis target currents at a traction side and a regeneration side allocated to the target torque given on a first high efficiency torque curve that represents the d-axis target currents for generating the target torques with minimum power consumption. The q-axis target current corresponding to the rotation speed is obtained through a linear interpolation using the rotation speed and q-axis target currents at the traction side and the regeneration side allocated to the target torque given on a second high efficiency torque curve that represents the q-axis target currents for generating the target torques with the minimum power consumption such that current corresponding to the d-axis and the q-axis target currents is applied to the motor.

An exemplary aspect of the invention includes an electric motor drive control system with a controller that derives a target current from a target torque, generates a current application command to apply electric current corresponding to the target current to an electric motor, applies energizing current to the motor based on a command of the current application command unit, and derives a target current corresponding to a rotation speed through a linear interpolation using the rotation speed and target currents at a traction side and a regeneration side each allocated to the target torque that has been given when the rotation speed of the motor is in a predetermined speed region including a zero rotation speed at which the target current for driving the motor allocated to the target torque is switched discontinuously.

An exemplary aspect of the invention includes an electric motor drive control system with a controller that derives d-axis and q-axis target currents from a target torque, generates a current application command to apply electric current corresponding to the target current to an electric motor, applies energizing current to the motor based on the current application command. The controller includes a first high efficiency torque curve table that holds the respective d-axis target currents for generating the respective target torques of the motor with minimum power consumption, a second high efficiency torque curve table representing the respective q-axis target currents for generating the respective target torques of the motor with the minimum power consumption. The controller derives the d-axis target current corresponding to a rotation speed through a linear interpolation using the rotation speed and the d-axis target currents at a traction side and a regeneration side each allocated to the target torque that has been given on the first high efficiency torque curve table. The controller derives the q-axis target current corresponding to the rotation speed through a linear interpolation using the rotation speed and the q-axis target currents at the traction side and the regeneration side each allocated to the target torque that has been given on the second high efficiency torque curve table when the rotation speed of the motor is in a predetermined speed region including a zero rotation speed at which the target current for driving the motor allocated to the target torque is switched discontinuously.

BRIEF DESCRIPTION OF THE DRAWINGS

Various embodiments of the invention will be described with reference to the drawings, wherein:

FIG. 14A is a graph showing the direction of the quadrant transition when the negative target torque value is given, and FIG. 14B is a generally employed graph showing the step jump in the d-axis target current during the quadrant transition;

FIG. 16A is a graph showing the direction of the quadrant transition when the negative target torque value is given, and FIG. 16B is a generally employed graph showing the step jump in the q-axis target current during the quadrant transition.

DETAILED DESCRIPTION OF EMBODIMENTS

Figure 1:
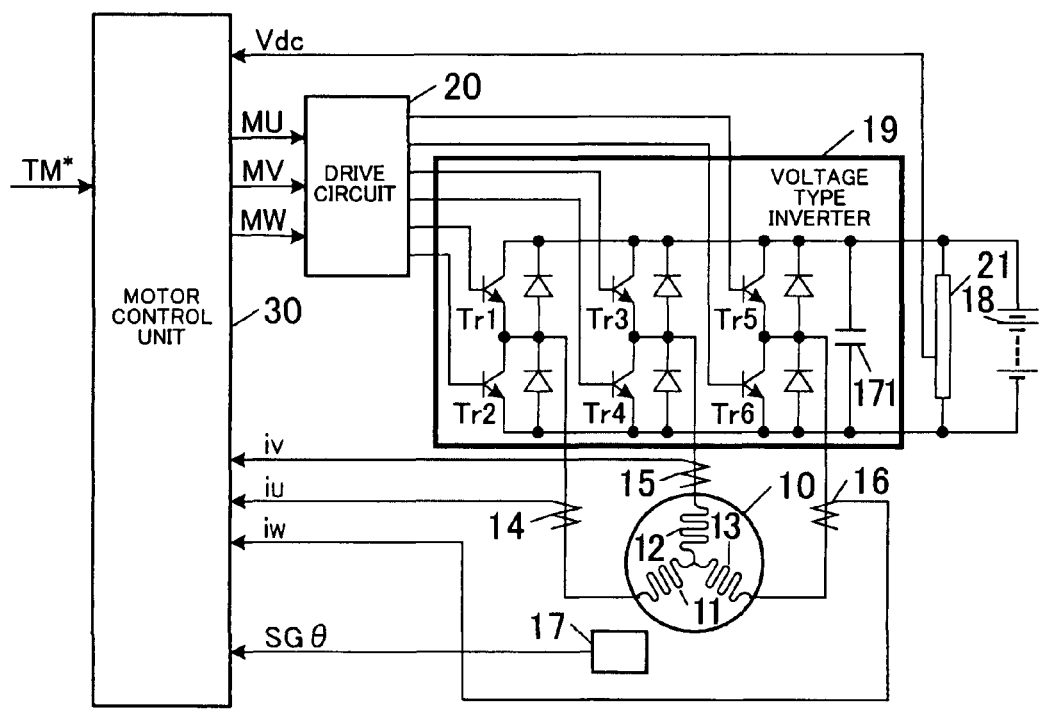
FIG. 1 is a block diagram schematically showing a structure of a first embodiment of the present invention.

Other objects and features of the present invention will become apparent by the explanation with respect to the following embodiment referring to the drawings.

First Embodiment

FIG. 1 shows an outline of a first embodiment according to the present invention. An electric motor 10 to be controlled is a permanent magnet type synchronous motor mounted on a vehicle to be driven for traveling, which has a rotor that contains a permanent magnet therein and a stator having three coils 11 to 13 each at the U-phase, V-phase and X-phase, respectively. A voltage type inverter 19 supplies power of a battery on the vehicle to the electric motor 10. The rotor of the electric motor 10 is connected to a rotor of a resolver 17 that detects a magnetic pole position of the rotor. The resolver 17 generates an analogue voltage (rotation angle signal) SGθ that represents the rotation angle of the rotor so as to be applied to a motor control unit 30.

The voltage type inverter 19 provided with six switching transistors Tr1 to Tr6 that are turned ON (conducted) to be driven through communication of six consecutive drive signals generated in parallel by a drive circuit 20 such that the DC voltage of the battery 18 is converted into AC voltage having three phases with the phase difference of 2π/3 therebetween, that is, three-phase AC voltage. The three-phase AC voltage is then applied to stator coils 11 to 13 at the three phases (U-phase, V-phase and W-phase) of the electric motor 10, respectively. Each electric current iU, iV and iW at the corresponding phase is applied to the stator coils 11 to 13 of the electric motor 10 so as to rotate the rotor thereof. The voltage type inverter 19 includes a large-capacitance capacitor 171 connected in parallel with the battery 18 serving as a power source for the purpose of enhancing the power supply capability to drive ON/OFF (switching) the transistors Tr1 to Tr6 with the PWM pulse, and suppressing the voltage surge.

Feeder cables connected to the stator coils 11 to 13 of the electric motor 10 are equipped with current sensors 14 to 16 each using the hall IC, respectively for detecting the respective electric currents iU, iV and iW to generate current detection signals (analog voltage) that will be applied to the motor control unit 30. A voltage sensor 21 transmits a voltage detection signal Vdc that represents the voltage of the vehicle battery 18 serving as the motor drive power source to the motor control unit 30. In the present embodiment, a partial pressure resistor is used in the voltage sensor 21.

In the embodiment, the motor control unit 30 is an electronic control unit mainly formed of a microcomputer MPU and includes the microcomputer MPU, the drive circuit 20, the current sensors 14 to 16, and an interface (signal processing circuit), not shown, between the resolver 17 and the voltage sensor 21. The motor control unit 30 further includes an interface (communication circuit), not shown, between the microcomputer MPU and a main controller of a vehicle travel control system (not shown) on the vehicle is further included.

Figure 2:
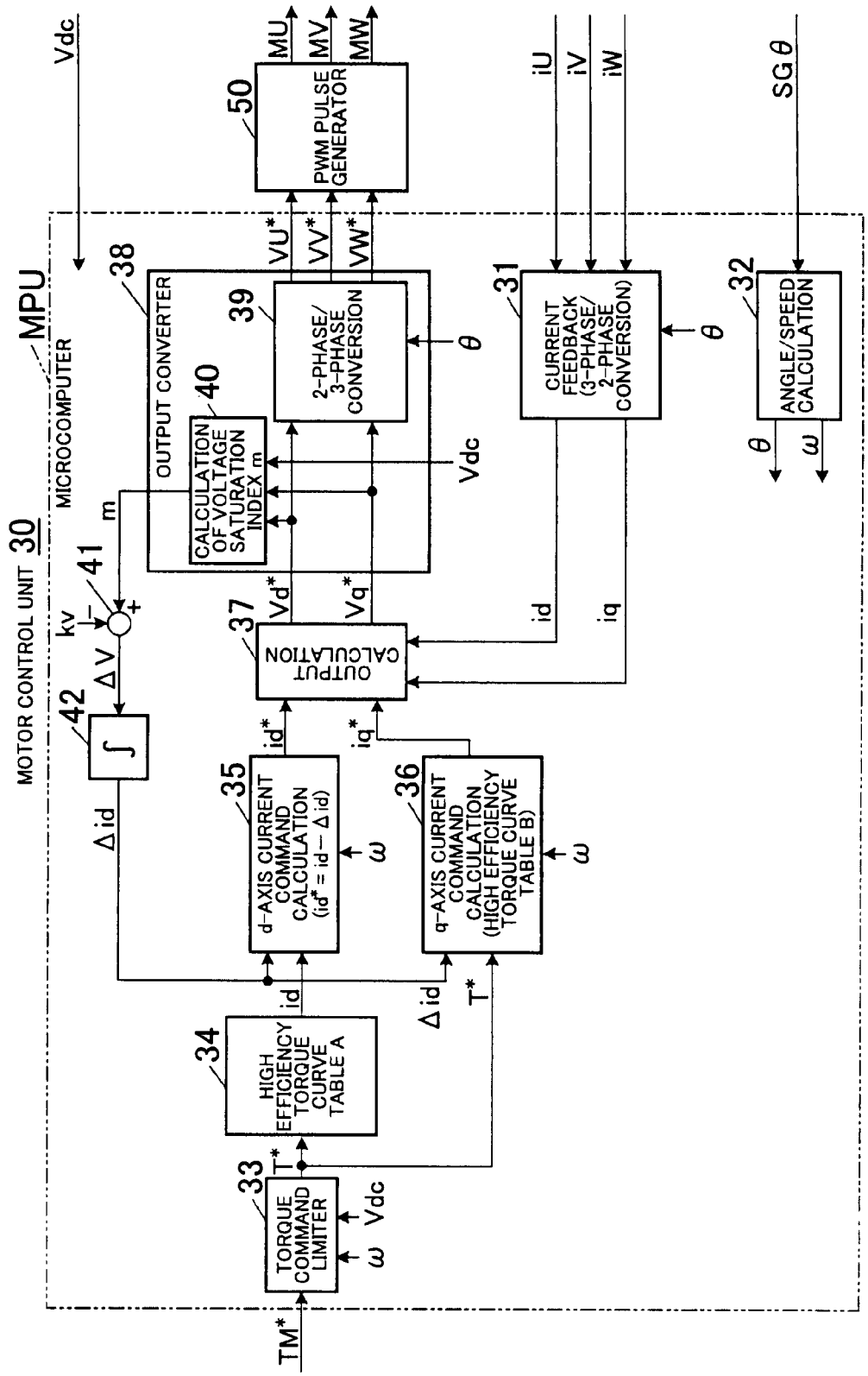
FIG. 2 is a block diagram schematically showing a function structure of a motor control unit shown in FIG. 1.

FIG. 2 schematically shows the function structure of the motor control unit 30. Based on the rotation angle signal SGθ applied from the resolver 17 shown in FIG. 1, an angle/speed calculation 32 of the microcomputer MPU calculates the rotation angle (magnetic pole position) θ and the rotation speed (angular speed) ω of the rotor of the electric motor 10.

Strictly, the rotation angle of the rotor of the electric motor 10 is not identical to the magnetic pole position thereof. However, they are proportionally related, and the proportional coefficient is defined by the number of magnetic poles p of the electric motor 10. Although the rotation speed is not identical to the angular speed, they are proportionally related, and the proportional coefficient is also defined by the number of magnetic poles p of the electric motor 10. The rotation angle θ and the rotation speed ω indicate the magnetic pole position and the angular speed, respectively herein. The rotation speed ω in rpm herein represents the rotation speed (rpm) of the rotor.

The microcomputer MPU in the embodiment executes a feedback control by performing the vector control calculation on a known d-q axis model where the d-axis is directed to the pair of magnetic poles of the rotor of the electric motor 10, and the q-axis is orthogonal to the d-axis. The microcomputer MPU digitally converts the current detection signals iU, iV and iW of the current sensors 14 to 16 respectively so as to be read, and further converts the three-phase current values iU, iV and iW on the stationary coordinate into the two-phase current values id and iq on the d-axis and the q-axis of the rotary coordinate using the three-phase/two phase conversion as the known stationary/rotary coordinate conversion through a current feedback 31.

The main controller (not shown) of the vehicle travel control system applies a motor target torque TM* to the microcomputer MPU of the motor control unit 30. The main controller calculates a required vehicle torque TO* based on the vehicle speed and accelerator opening degree of the vehicle, and generates the motor target torque TM* corresponding to the required vehicle torque TO* so as to be applied to the microcomputer MPU. The microcomputer MPU outputs the rotation speed ω rpm of the electric motor 10 to the main controller.

A torque command limiter 33 of the microcomputer MPU reads a limit torque TM*max corresponding to the DC voltage Vdc and the rotation speed ω from a limit torque table (look-up table), and sets the TM*max to the target torque T* when the motor target torque TM* applied by the main controller exceeds the TM*max. When it is equal to or smaller than the TM*max, the motor target torque TM* applied by the main controller is set to the target torque T*. The motor target torque T* obtained by the aforementioned limitation is given to a first high efficiency torque curve table A 34.

The limit torque table is a memory region into which the maximum torque that may be generated by the electric motor 10 as the limit torque TM*max is written at addresses as values of the voltage Vdc and the rotation speed ω within the variable range of the DC voltage Vdc and the range of the rotation speed ω. In the embodiment, it corresponds to one memory region of a RAM (not shown) in the microcomputer MPU. The value of the limit torque TM*max becomes large as the DC voltage Vdc becomes high, and becomes small as the DC voltage Vdc becomes low. Also, the value of the limit torque TM*max becomes large as the rotation speed ω becomes low, and becomes small as the DC voltage Vdc becomes high.

The microcomputer MPU contains a nonvolatile memory into which the data of the limit torque table has been written. The data may be read from the nonvolatile memory so as to be written into the RAM in the process where the operation voltage is applied to the microcomputer MPU to initialize by itself and the motor drive system shown in FIG. 1. The microcomputer MPU includes other similar look-up tables that will be described later. Like the limit torque table, they represent the memory regions on the RAM into which the reference data stored in the nonvolatile memory have been written.

The respective d-axis current values id, that each correspond with the motor speed ω and the motor target torque T* for generating the target torques T* at the respective motor speeds, are written in the first high efficiency torque curve table A 34 serving as one of the look-up tables.

Figure 5:
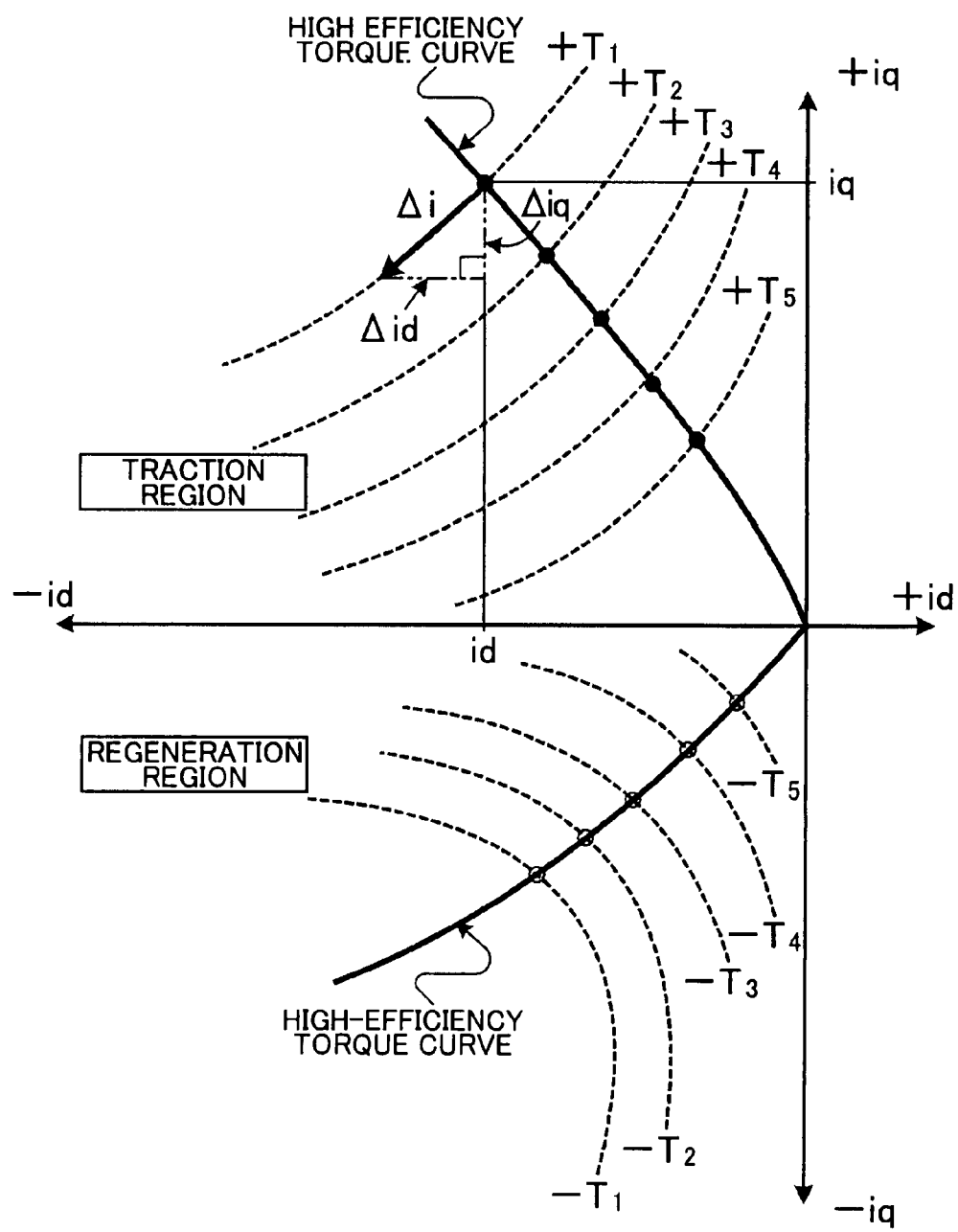
FIG. 5 is a graph schematically showing the high efficiency torque curve of an electric motor shown in FIG. 1 where the horizontal axis represents the d-axis current value and the vertical axis represents the q-axis current value.

FIG. 5 shows the high efficiency torque curves. The output torque of the electric motor is determined corresponding to the respective values of the d-axis current id and the q-axis current iq. Referring to the dotted curves in FIG. 5, there are infinite number of combinations of the id value and the iq value for outputting the same torque with respect to the single rotation speed value, that is, at the same motor rotation speed. The dotted curves represent the constant torque curves. There is a combination of the id and iq with the maximum power consumption efficiency (minimum power consumption) on the constant torque curve as the high efficiency torque point. The curve formed by plotting a plurality of the high frequency torque points on the plural torque curves (shown by the bold solid curve in FIG. 5) at the respective rotation speeds exists as the high efficiency torque curve. The electric motor 10 is energized, taking the d-axis current id and the q-axis current iq at the position of the given motor target torque T* as the target current values on the high efficiency torque curve at the rotation speed of the motor such that the electric motor 10 outputs the target torque T* and the power consumption efficiency for the motor energization is enhanced.

In the embodiment, the high efficiency torque curve is divided into two sections, that is, the first high efficiency torque curve A that represents the d-axis value, and the second high efficiency torque curve B that represents the q-axis value, respectively. The first high efficiency torque curve A includes a pair of sections for the traction region and the regeneration region representing the d-axis target current with respect to the motor rotation speed and the target torque.

The first high efficiency torque curve table A 34 as a memory region, where the d-axis target current for generating the target torque with respect to the target torque T* with the minimum power consumption is written, includes a pair of a traction table A1 for the traction and a regeneration table A2 for the regeneration. The use of the traction table or the regeneration table is determined depending on the determination with respect to the case of traction or regeneration (see FIG. 12) based on the rotation speed $\omega$ of the electric motor and the given target torque T*.

As the rotation speed $\omega$ of the electric motor 10 increases, the inverse electromotive force generated in the stator coils 11 to 13 is increased to raise the terminal voltages thereof. Accordingly, it becomes difficult to supply the target current to the coils 11 to 13 from the inverter 19, thus failing to obtain the target torque output. In the aforementioned case, although the power consumption efficiency is reduced, the d-axis current id and the q-axis current iq are decreased by $\Delta id$ and $\Delta iq$, respectively along the constant torque curve (for example, the dotted curve of +T1 shown in FIG. 5) with respect to the given motor target torque T* so as to be outputted. The aforementioned process may be called as the weakening magnetic field control. The d-axis weakening magnetic field current $\Delta id$ is generated by a magnetic field adjustment amount calculation unit 42 so as to be given to the d-axis current command calculation 35 and the q-axis current command calculation 36. The calculation of the d-axis weakening magnetic field current $\Delta id$ will be described later.

The d-axis current command calculation 35 shown in FIG. 2 subtracts the d-axis weakening magnetic field current $\Delta id$ from the d-axis current value id read from the first high efficiency torque curve table A 34 corresponding to the target torque T* outputted from the torque command limiter 33 to calculate the d-axis target current id* as follows so as to be given to the output calculation 37.

$$id^* = -di - \Delta id \quad (3)$$

The q-axis current command calculation 36 shown in FIG. 2 includes the second high efficiency torque curve table B. It is obtained by correcting the second high efficiency torque curve B representing the q-axis value of the high efficiency torque curve (shown in FIG. 5, for example) to the curve representing the q-axis target current derived by subtracting the q-axis weakening magnetic field current $\Delta iq$ paired with the d-axis weakening magnetic field current $\Delta id$, and further storing data of the corrected second high efficiency torque curve B.

The second high efficiency torque curve table B is a memory region where the d-axis target current with respect to the target torque T* and the d-axis weakening magnetic field current $\Delta id$ for generating the target torque with the minimum power consumption, that is, the target current value of the corrected second high efficiency torque curve B. The second high efficiency torque curve table B also includes a pair of a traction table B1 for the traction and a regeneration table B2 for the regeneration. The use of the traction table or the regeneration table is determined dependent on the determination with respect to the case of traction or regeneration (see FIG. 12) based on the rotation speed $\omega$ of the electric motor and the target torque T*.

The q-axis current command calculation 36 reads the q-axis target current iq* with respect to the target torque T* and the d-axis weakening magnetic field current $\Delta id$ from the second high efficiency torque curve table B so as to be given to the output calculation 37.

Figure 12:
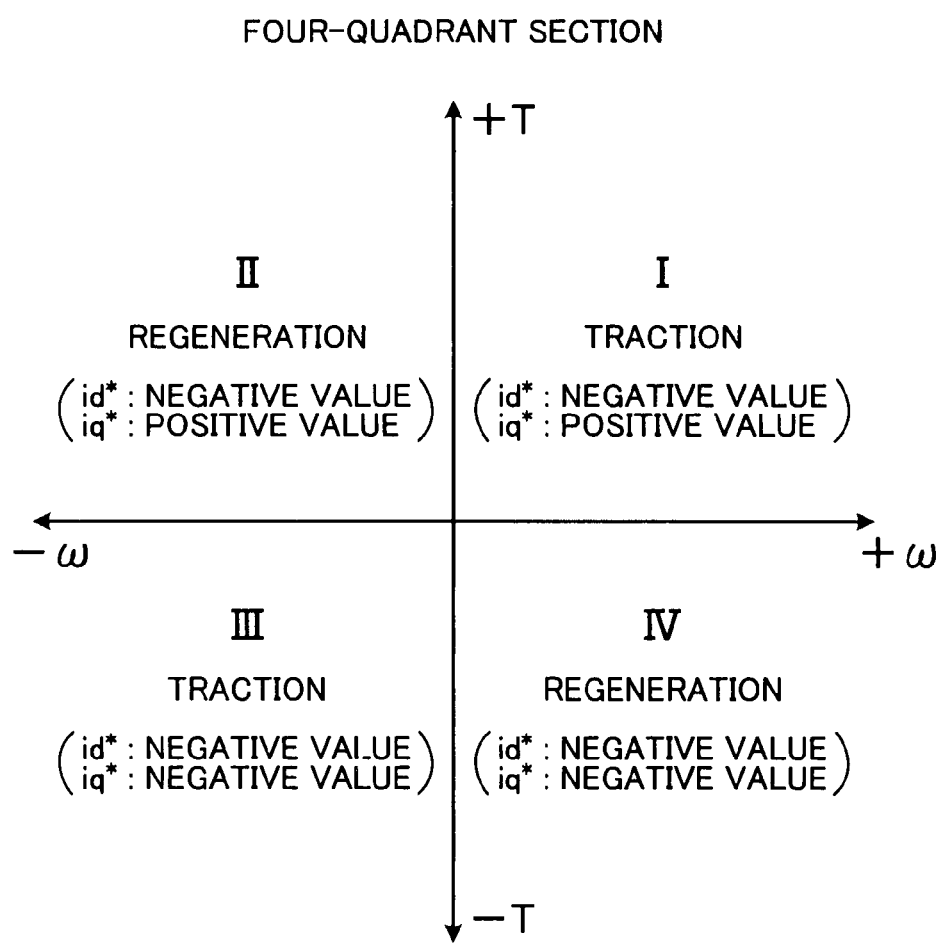
FIG. 12 is a graph showing the quadrant sections with respect to the rotation speed and the generated torque of the electric motor shown in FIG. 1, and each polarity in the d-axis current and the q-axis current in the respective sections.
Figure 13A:
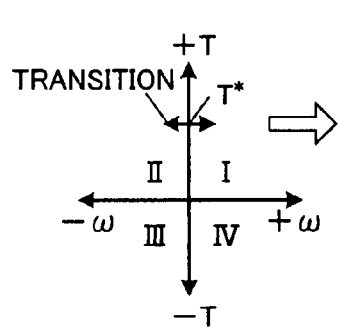
FIG. 13A is a graph showing the direction of the quadrant transition when the positive target torque value is given.
Figure 13B:
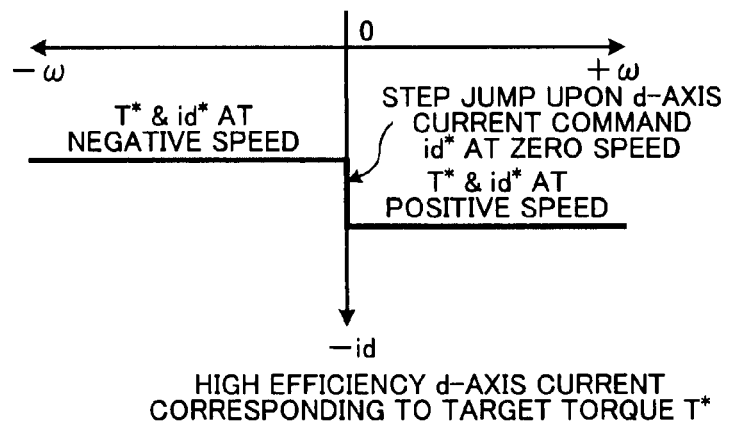
FIG. 13B is a generally employed graph showing the step jump in the d-axis target current during the quadrant transition.
Figure 15A:
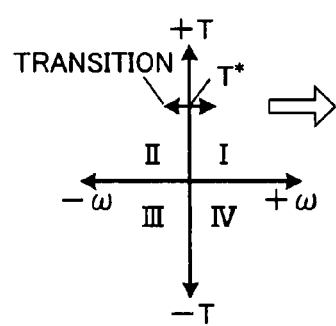
FIG. 15A is a graph showing the direction of the quadrant transition when the positive target torque value is given.
Figure 15B:
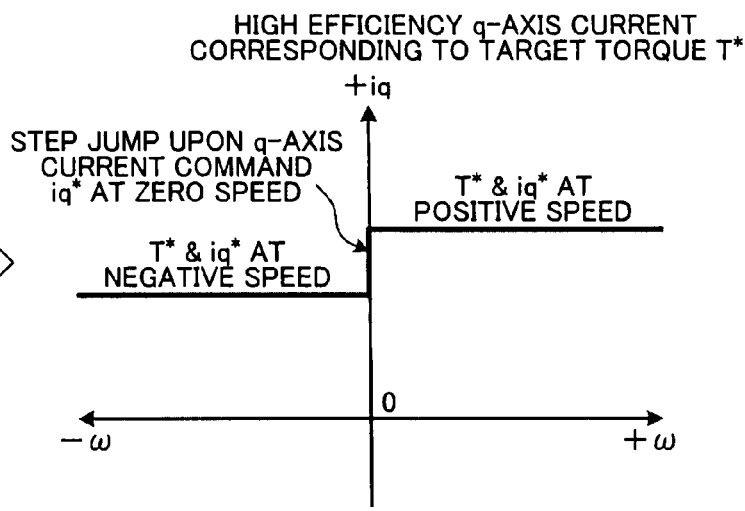
FIG. 15B is a generally employed graph showing the step jump in the q-axis target current during the quadrant transition.

The combination of the rotation speed $\omega$ and the output torque T of the electric motor 10 may be represented by the four-quadrants as shown in FIG. 12. As the rotation speed $\omega$ passes the speed zero, the quadrant transition occurs from the traction to the regeneration or vice versa. At the boundary region between the traction region and the regeneration region (speed zero), the high-efficiency torque curve is formed in the discontinuous manner, as shown in FIG. 5. When the rotation speed $\omega$ passes the speed zero, the d-axis and q-axis target current values may step jump as shown in FIGS. 13A to 16B, for example, thus making the rotation of the electric motor 30 unstable. In the embodiment, the speed zero region with a predetermined width having the speed $\omega$=0 as the center is set as the smoothing section or the continuous section such that the following setting is made.

$$\omega_1 \text{ to } \omega_2, \omega_1 = -512 \text{ rpm}, \omega_2 = +512 \text{ rpm}$$

When the rotation speed $\omega$ is in the aforementioned region, the d-axis and q-axis target current values idU and iqU on the traction tables A1 and B1, and the d-axis and q-axis target current values idL and iqL on the regeneration tables A2 and B2 are allocated to the respective values at the ends of the zero speed region. Based on the aforementioned values and the rotation speed $\omega$, the d-axis and q-axis target currents id* and iq* corresponding to the rotation speeds $\omega$ are calculated through the linear interpolation, in other words, a smoothing or continuing process.

When the rotation speed $\omega$ deviates from the zero speed region that is set as being equal to or higher than $\omega_1$ and equal to or lower than $\omega_2$, d-axis current command calculation 35 sets the calculated value id* in the formula (3) to the d-axis target current value id*. When the rotation speed $\omega$ is in the zero speed region, d-axis current command calculation 35 reads the d-axis target current values id1 and id2 corresponding to the target torque T* in the traction table A1 and the regeneration table A2 in the first high efficiency torque curve table A 34, and the d-axis target current id* is calculated on the basis of the regeneration target current idL using the following formula where idU=−id1, and idL=−id2.

$$id^* = idL + (idU - idL) \cdot (\omega - \omega_1)/(\omega_2 \omega_1) \quad (1a)$$

It may be calculated on the basis of the traction target current idU using the following formula.

$$id^* = idU - (idU - idL) \cdot (\omega_2 - \omega)/(\omega_2 - \omega_1) \quad (2a)$$

The d-axis target current value id* that has been calculated based on the d-axis current value id read from the first high efficiency torque curve table A 34 is replaced by the calculated value as the d-axis target current value id*. Accordingly, the d-axis target current id* undergoes the linear transition in accordance with the rotation speed $\omega$ as shown by the diagonal line of FIGS. 7A and 7B or FIGS. 8A and 8B, that is, the smooth transition without causing the step jump so long as the rotation speed $\omega$ is in the zero speed region defined as the region around the boundary between the traction region and the regeneration region.

When the rotation speed $\omega$ deviates from the zero speed region that is set as being equal to or higher than $\omega_1$ and equal to or lower than $\omega_2$, the q-axis current command calculation 36 sets the read value iq* to the q-axis target current value iq*. However, when the rotation speed $\omega$ is in the zero speed region, the q-axis current command calculation 36 reads the q-axis target current values iqU=iq1 and the q-axis target current iqL=iq2 corresponding to the target torque T* and the d-axis weakening magnetic field current Aid from the traction table B1 and the regeneration table B2 of the second high efficiency torque curve table B. The q-axis target current iq* is calculated on the basis of the target current iqL at the regeneration side.

$$iq* = iqL + (iqU - iqL) \cdot (\omega - \omega_1)/(\omega_2 - \omega_1) \quad (1b)$$

It may be calculated on the basis of the traction target current iqU at the traction side using the following formula.

$$iq* = iqU - (iqU - iqL) \cdot (\omega_2 - \omega)/(\omega_2 - \omega_1) \quad (2b)$$

The q-axis target current value iq that has been read from the second high efficiency torque curve table B is replaced by the calculated value as the q-axis target current value iq*. Accordingly, the q-axis target current iq* undergoes the linear transition in accordance with the rotation speed ω as shown by the diagonal line of FIGS. 9A and 9B or FIGS. 10A and 10B, that is, a smooth transition without causing the step jump so long as the rotation speed ω is in the zero speed region defined as the region around the boundary between the traction region and the regeneration region.

The aforementioned d-axis and q-axis target current values id* and iq* are given to the output calculation 37 shown in FIG. 2. The output calculation 37 executes a proportional control and integral control (PI calculation under the feedback control) based on the current difference δid between the d-axis target current id* and the d-axis current id, and current difference δiq between the q-axis target current iq* and the q-axis current iq that have been calculated. The voltage drop Vzdp that represents the voltage command value of the proportional component and the voltage drop Vzdi that represents the voltage command value of the integral component are calculated based on the current difference δid such that the voltage drop Vzd is calculated by adding the voltage drops Vzdp and Vzdi as shown by the following formula.

$$Vzd = Vzdp + Vzdi \quad (4)$$

The output calculation 37 reads the rotation speed ω and the q-axis current iq to calculate the induced voltage ed induced by the q-axis current iq based on the rotation speed ω, the q-axis current iq and the q-axis inductance Lq as shown by the following formula.

$$ed = \omega \cdot Lq \cdot iq \quad (5)$$

The output calculation 37 further subtracts the induced voltage ed from the voltage drop Vzd to calculate the d-axis voltage command value Vd* as the output voltage as shown by the following formula.

$$Vd^* = Vzd - ed \quad (6)$$
$$= Vzd - \omega \cdot Lq \cdot iq$$

The output calculation 37 further calculates the voltage drop Vzqp that represents the voltage command value of the proportional component and the voltage drop Vzqi that represents the voltage command value of the integral term based on the current difference δiq, and adds the voltage drops Vzqp and Vzqi to calculate the voltage drop Vzq as shown by the following formula.

$$Vzq = Vzqp + Vzqi$$

The output calculation 37 calculates the induced voltage induced by the d-axis current id based on the rotation speed ω, the inverse electromotive voltage constant MIf, the d-axis current id and the inductance Ld on the d-axis as follows.

$$eq = \omega(MIf + Ld \cdot id) \quad (7)$$

The output calculation 37 further calculates the q-axis voltage command value Vq* as the output voltage by adding the induced voltage eq to the voltage drop Vzq as follows.

$$Vq^* = Vzq + eq \quad (8)$$
$$= Vzq + \omega(MIf + Ld \cdot id)$$

A two-phase/three-phase converter 39 serving as a rotary/stationary coordinate converter in an output converter 38 converts the target voltages Vd* and Vq* on the rotary coordinate output by the output calculation 37 into the target voltages VU*, VV* and VW* on the stationary coordinate in accordance with the two-phase/three-phase conversion and transmits the target voltages VU*, VV* and VW* to a PWM pulse generator 50. The PWM pulse generator 50 converts the three-phase target voltages VU*, VV* and VW* into the PWM pulses MU, MV and MW for outputting the voltages corresponding to the respective values and outputs the PWM pulses MU, MV and MW to the drive circuit 20. The drive circuit 20 generates six consecutive drive signals in parallel based on the PWM pulses MU, MV and MW so as to switch the transistors Tr1 to Tr6 of the voltage type inverter 19 ON/OFF with the respective consecutive drive signals. The voltages VU*, VV* and VW* are applied to the stator coils 11 to 13 of the electric motor 10, respectively such that the phase currents iU, iV and iW are applied.

Referring to FIG. 2 again, the output converter 38 uses a function block 40 contained therein to calculate a voltage saturation index m that is a parameter for the weakening magnetic field control. That is, the voltage saturation index m is calculated as the value indicating the level of the voltage saturation based on the d-axis voltage command value vd* and the q-axis voltage command value vq* as follows so as to be transmitted to a subtractor 41.

$$m = \sqrt{(vd^{*2} + vq^{*2})}/Vdc \quad (9)$$

The subtractor 41 subtracts a constant kv (0.78 in the embodiment) from the voltage saturation index m to calculate the voltage saturation calculated value ΔV. The subtractor 41 then transmits the voltage saturation calculated value ΔV to a magnetic field adjustment amount calculation unit 42. The constant kv is set when a threshold value representing the maximum output voltage of the inverter 19 is set as the comparative value Vmax as follows.

$$Vmax = k \cdot Vdc \quad (10)$$
$$\Delta V = m - kv \quad (11)$$

The magnetic field adjustment amount calculation unit 42 accumulates the value ΔV. If the accumulated value ΣΔV takes the positive value, the proportional constant is multiplied by the accumulated value ΣΔV to calculate the d-axis weakening magnetic field current Δ, and the d-axis weakening magnetic field current Δid is set to the positive value for executing the weakening magnetic field control. If the voltage saturation calculated value ΔV or the accumulated value ΣΔV takes the value equal to or smaller than zero, the adjustment value Δid and the accumulated value ΣΔV are set to zero. The adjustment value Δid is given to the d-axis current command calculation 35 and the q-axis current command calculation 36, respectively.

The microcomputer MPU shown in FIG. 2 includes a RAM, a ROM and a flash memory for storing the data and various types of programs in addition to the CPU. The program, reference data, and look up table stored in the ROM or the flash memory are written into the RAM, based on which the input process, calculation and output process are executed as indicated by the region enclosed by the chain double-dashed line shown in FIG. 2.

Figure 3:
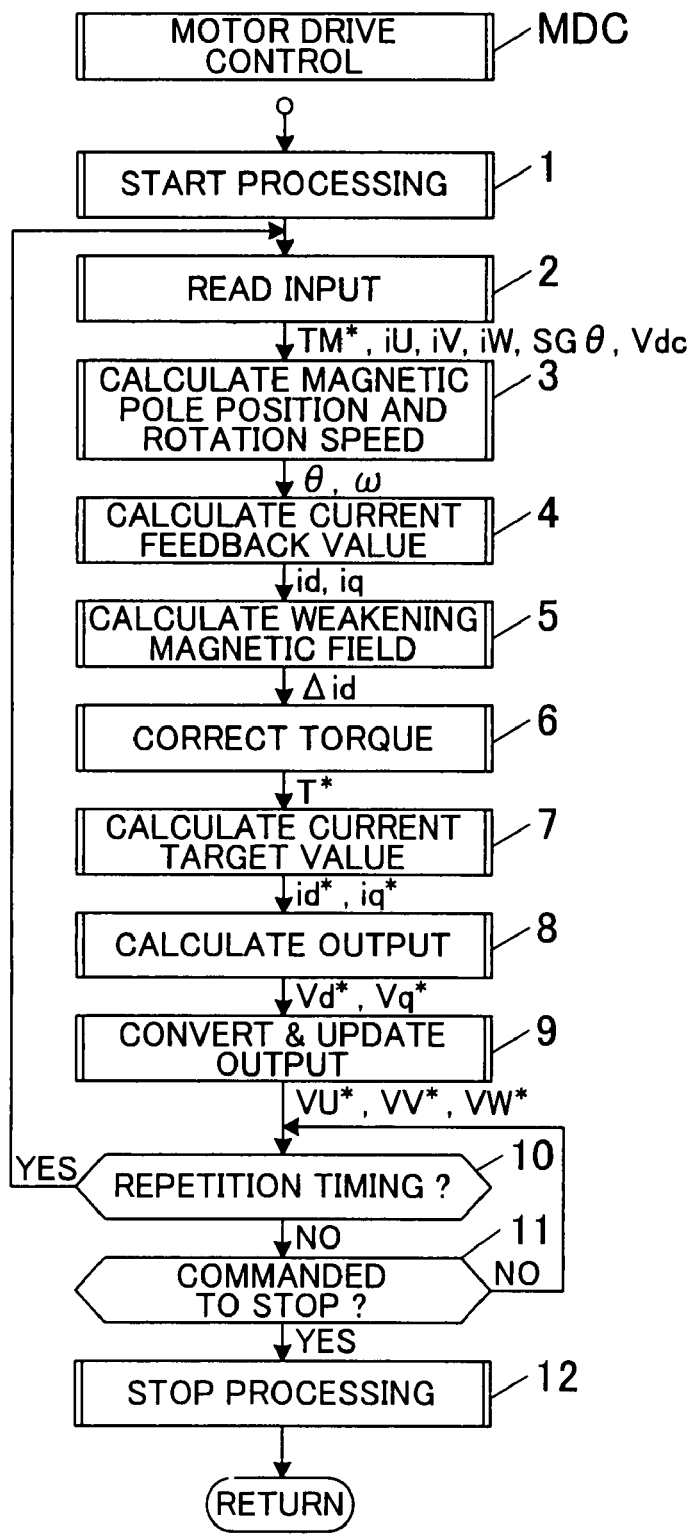
FIG. 3 is a flowchart schematically showing a motor drive control routine executed in a microcomputer shown in FIG. 3.

FIG. 3 schematically shows the motor drive control MDC executed by the (CPU of the) microcomputer MPU based on the program. Upon application of the voltage for operation, the microcomputer MPU initializes the motor drive system shown in FIG. 1 as well as itself to be in the stationary stand-by state, waiting for the motor drive start command from the main controller of the vehicle travel control system (not shown). In response to reception of the motor drive start command, the microcomputer MPU sets the motor drive system into the state that allows the motor drive control MDC to be executed by "start processing" (step 1). In the description hereinafter, only the number of the step will be shown in parenthesis. Then in "read input" (2), the input signals or the data are read. That is, the motor target torque TM* given by the main controller is read, and the current detection signals iU, iV, iW are read through the digital conversion, and the rotation angle signal SGθ and the power source voltage signal Vdc are further read through the digital conversion.

The microcomputer MPU calculates the rotation angle θ and the rotation speed ω based on the rotation angle signal SGθ (rotation angle data SGθ) that has been read (3). The function is represented by the angle/speed calculation 32 as shown in FIG. 2. Then the microcomputer MPU executes the three-phase/two-phase conversion to convert the read three-phase current detection signals iU, iV and iW into the two-phase d-axis current value id and q-axis current value iq (4). The function is represented by the current feedback 31 as shown in FIG. 2. The microcomputer MPU calculates the d-axis weakening magnetic field current ΔAid for executing the d-axis weakening magnetic field control in reference to the accumulated value ΣΔV by multiplying the proportional constant by the accumulated value ΣΔV (5). The function is represented by the magnetic field adjustment amount calculation unit 42 as shown in FIG. 2. The microcomputer MPU reads the limit torque TM*max corresponding to the read motor target torque TM*, the read DC voltage Vdc and the calculated rotation speed ω from the limit torque table. When the read motor target torque TM* exceeds the TM*max, the TM*max is set to the target torque T*. When it is equal to or smaller than the TM*max, the read motor target torque TM* is set to the target torque T* (6). The function is represented by the torque command limiter 33 as shown in FIG. 2.

Figure 4:
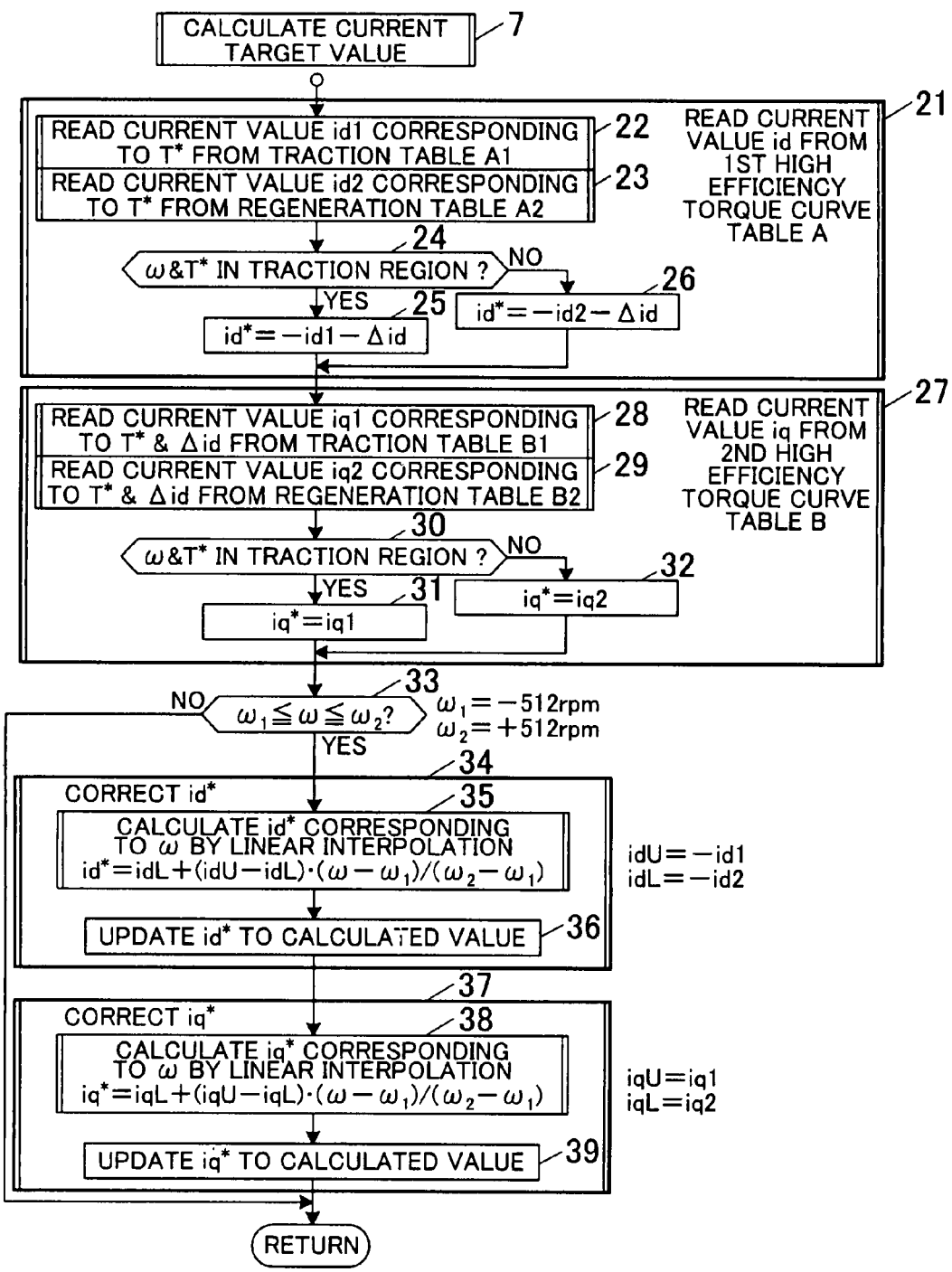
FIG. 4 is a flowchart showing the process of the "current target value calculation" shown in FIG. 3.

FIG. 4 shows the process executed in a "current target value calculation" (7) shown in FIG. 3. Referring to FIG. 4, in the "current target value calculation", the microcomputer MPU reads the d-axis current values id1 and id2 at the traction and regeneration sides correlated with the aforementioned target torque T* from the first high efficiency torque curve table A (21, 22, 23). It is determined whether the combination of the motor rotation speed ω and the target torque T* is in the traction region or the regeneration region (see FIG. 12) (24). The d-axis current value id1 is set to the d-axis current id if it is determined that the combination is in the traction region. The d-axis current value id2 is set to the d-axis current id if it is determined that the combination is in the regeneration region. Then the d-axis target current id* is calculated using the Aid that has been calculated in the "magnetic field weakening calculation" (5) (24 to 26).

$$id^* = -id - \Delta id \quad (3)$$

The microcomputer MPU reads the q-axis current values iq1 and iq2 at the traction and regeneration sides correlated with the aforementioned target torque T* and the d-axis weakening magnetic field current value Aid from the second high efficiency torque curve table B (27, 28, 29). It is determined whether the combination of the motor rotation speed ω and the target torque T* is in the traction region or the regeneration region (see FIG. 12) (30). The q-axis current value iq1 is set to the q-axis target current iq* if it is determined that the combination is in the traction region. The q-axis current value iq2 is set to the q-axis target current iq* if it is determined that the combination is in the regeneration region (30 to 32).

The microcomputer MPU detects whether the rotation speed ω rpm is in the zero speed region determined as being equal to or higher than $\omega_1$ (−512 rpm) and is equal to or lower than $\omega_2$ (+512 rpm) (33). If it deviates from the region, the "current target value calculation" (7) ends, and the process proceeds to subsequent "output calculation" (8) shown in FIG. 3.

If it is in the zero speed region, the d-axis target current id* is calculated (34, 35) as follows using the d-axis current values id1 and id2 at the traction and regeneration sides that have been read in steps 22 and 23, under the condition where idU=−id1, idL=−id2, on the basis of the d-axis current value at the regeneration side, that is, idL=−id2.

$$id^* = idL + (idU - idL) \cdot (\omega - \omega_1)/(\omega_2 - \omega_1) \quad (1a)$$

The symbol ω represents the rotation speed (rpm) of the motor. The d-axis target current value id* calculated in the formula (3) is replaced by the calculated value so as to be set to the d-axis target current value id* (36). Then the q-axis target current iq* is calculated (37, 38) as follows using the q-axis current values iq1 and iq2 at the traction and regeneration sides that have been read in steps 28 and 29 as the following iqU and iqL on the basis of the q-axis current value at the regeneration side, that is, iqL=iq2.

$$iq^* = iqL + (iqU - iqL) \cdot (\omega - \omega_1)/(\omega_2 - \omega_1) \quad (1b)$$

The calculated value is set to the q-axis target current value iq* (39). The process proceeds to the "output calculation" (8) shown in FIG. 3.

The function of the above-described "current target value calculation" (7) is represented by the d-axis current command calculation 35 and the q-axis current command calculation 36 as shown in FIG. 2. When the rotation speed ω is in the zero speed region set as the region around the boundary between the traction region and the regeneration region, the d-axis target current id* undergoes the linear transition in correspondence with the rotation speed ω as the diagonal line in FIGS. 7A and 7B or FIGS. 8A and 8B shows. The q-axis target current iq* also undergoes the linear transition in accordance with the rotation speed ω as the diagonal line in FIGS. 9A and 9B or FIGS. 10A and 10B shows. In other words, both the d-axis and q-axis target currents id* and iq* undergo the smooth transition without causing the step jump.

Referring to FIG. 3 again, subsequent to the "current target value calculation" (7), the microcomputer MPU converts the deviations δid and δiq of the feedback currents id and iq calculated in step 4 with respect to the d-axis and q-axis target currents id* and iq* into the d-axis and q-axis target voltages Vd* and Vq*, respectively (8). Then the d-axis and q-axis target voltages Vd* and Vq* are converted into the three-phase voltages VU*, VV* and VW* so as to be updated and output to the PWM pulse generator 50. After the updating and outputting, based on the thus obtained d-axis and q-axis target currents id* and iq*, and the power source voltage Vdc, the voltage saturation index m used for executing the weakening magnetic field control is calculated, and the voltage saturation calculation value ΔV is further calculated. The value ΔV is summed to the accumulated value ΣΔV, based on which the d-axis weakening magnetic field current Δid is calculated for executing the subsequent weakening magnetic field control. The calculated d-axis weakening magnetic field current Δid is used for the subsequent "current target value calculation" (7). The processing functions of the "output calculation" (8) and the "output conversion & output updating" (9) are represented by the output calculation 37, the output converter 38, the subtractor 41 and the magnetic field adjustment amount calculation unit 42 as shown in FIG. 2.

Referring to FIG. 3, the microcomputer MPU updates the calculated three-phase voltages VU*, VV* and VW* to be output to the PWM pulse generator 50. After a period of time until the next repetitive processing timing (10), the process proceeds to the "input reading" (2) again. The processes subsequent to the aforementioned "input reading" (2) will be executed. If the stop command is issued from the system controller during the stand-by period until the subsequent repetitive processing timing (11), the microcomputer MPU stops outputting for energizing the motor to be rotated (12).

In the low speed region where the rotation speed of the electric motor 10 has a possibility to pass the boundary (rotation speed=zero) between the traction control region and the regeneration control region, that is, in the predetermined speed region (the zero speed region), the target currents id* and iq* corresponding to the rotation speed are determined through the linear interpolation using the target currents idU and iqU at the traction side and the target currents idL and iqL at the regeneration side, and the rotation speed ω for generating the target torque T*. When the operation of the electric motor undergoes the quadrant transition from the traction control region to the regeneration control region, or vice versa, the target currents id* and iq* never cause the step jump. The rotor of the electric motor, thus, may smoothly rotate irrespective of the quadrant transition. If the quadrant transition occurs during the hill climbing at low speeds, the present invention allows the rotor to be rotated smoothly and stably.

Figure 11:
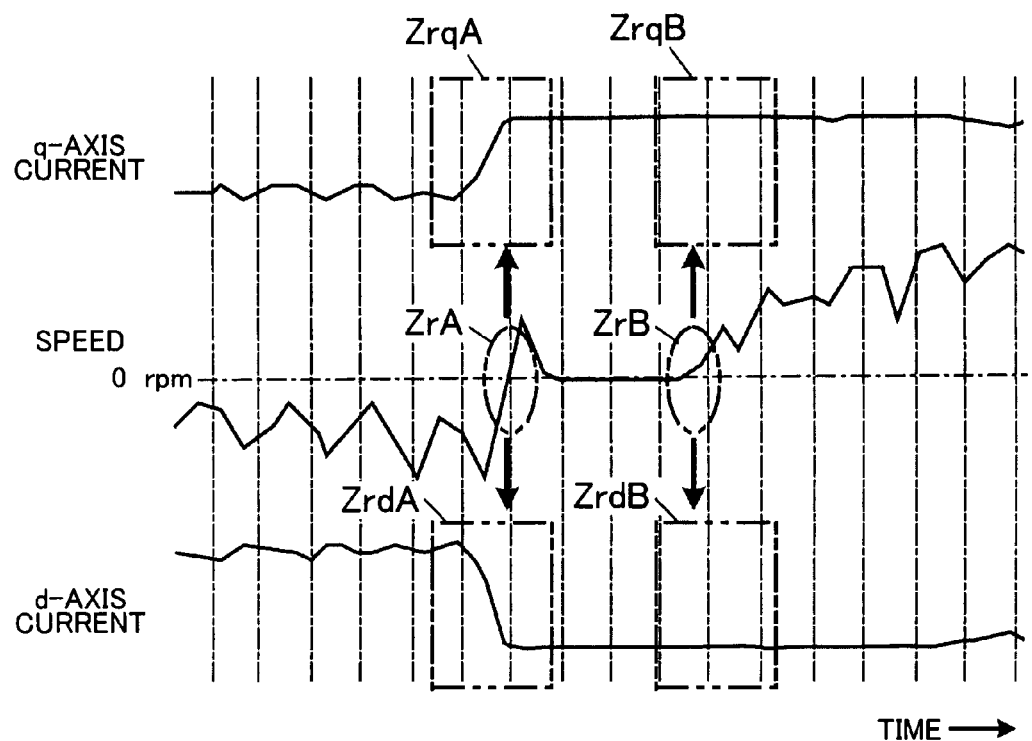
FIG. 11 is a timing chart showing each change in the motor rotation speed ω, and the d-axis and the q-axis current values (outputs shown in FIG. 2) when the motor rotation speed is switched from negative to positive to cause the quadrant transition from the regeneration to the traction during the hill climbing where the target torque is a positive value.

FIG. 11 shows the changes in the motor rotation speed ω and the d-axis and q-axis currents (outputs of 32, 31 as shown in FIG. 2) during the hill climbing in the state where the target torque T* is set as the positive value and the motor rotation speed ω has switched from negative to positive, that is, the quadrant transition has occurred from the regeneration to the traction. In the region ZrdA and ZrqA where the d-axis and q-axis currents change in the speed region ZrA at which the quadrant transition occurs, the d-axis and q-axis currents undergo smooth transition without causing the torque shock. In the change regions ZrdB and ZrqB of the d-axis and q-axis currents in the speed region ZrB where the speed starts to be positive from the zero speed region, the d-axis and the q-axis current undergo the smooth transition without causing the torque shock.

Only a single pair of the high efficiency torque current table, for example, table A may be employed. The traction table and the regeneration table are correlated with the target torque to maintain the d-axis and the q-axis target currents id and iq so as to be read from the table simultaneously. The id is given to the d-axis current command calculation 35, and the iq is given to the q-axis current command calculation 36. The d-axis current command calculation 35 has the same function as that shown in FIG. 2. The q-axis current command calculation 36 may be structured to include a calculation function for converting the d-axis weakening magnetic field current Δid into the q-axis weakening magnetic field current Δiq paired therewith, or include the look up table in place of the table B. The q-axis current command calculation 36 may be structured to subtract the q-axis weakening magnetic field current Δiq that has been calculated based on the d-axis weakening magnetic field current Δid from the iq read from the table A.

The stator coils 11 to 13 are star connected. If two of the phase current values of the respective phases are determined, the current value of the rest of the phase current may be obtained. Accordingly, each lead wire of the U-phase and V-phase stator coils 11 and 12 may be equipped with the current sensors 14 and 15, respectively for controlling the currents iU, iV and iW of the respective phases. In this case, the current sensor 16 may be omitted, and the current iw at the W-phase may be calculated based on the detection values iu and iv of the current sensors 14 and 15 so as to be set as the W-phase current detection value.

According to an exemplary aspect of the invention, an electric motor drive control method for deriving a target current (for example id*, iq*) from a target torque (for example T*) to apply electric current (for example iU, iV, iW) corresponding to the target current (for example id*, iq*) to an electric motor (for example 10) is characterized in that when a rotation speed (for example ω) of the motor is in a predetermined speed region (for example $\omega_1 \leq \omega \leq \omega_2$) including a zero rotation speed (for example ω=0) at which the target current (for example id*, iq*) for driving the motor allocated to the target torque (for example T*) is switched discontinuously, the target current (for example id*, iq*) corresponding to the rotation speed (for example ω) is obtained through a linear interpolation using the rotation speed (for example ω) and target currents at a traction side (for example idU, iqU) and a regeneration side (for example idL, iqL) allocated to the target torque (for example T*) such that the electric current (for example iU, iV, iW) corresponding to the target current (for example id*, iq*) is applied to the electric motor (for example 10).

Referring to FIG. 12 for example, when the motor rotation speed ω or the torque T passes the zero point, the four-quadrant operation of the motor is switched from traction to regeneration or vice versa, in other words, the quadrant transition occurs. The "high efficiency torque curve" for deriving the target current is asymmetrical with respect to the d-axis (id-axis) as shown in FIG. 5, for example, and discontinuous at the motor speed of 0 (between traction and regeneration). Accordingly, the interval between two values of the target currents (for example id*, iq*) derived just before and after the quadrant transition based on the "high efficiency torque curve" becomes discontinuous, resulting in the step jump as shown in FIGS. 13 to 16, for example.

Figure 6:
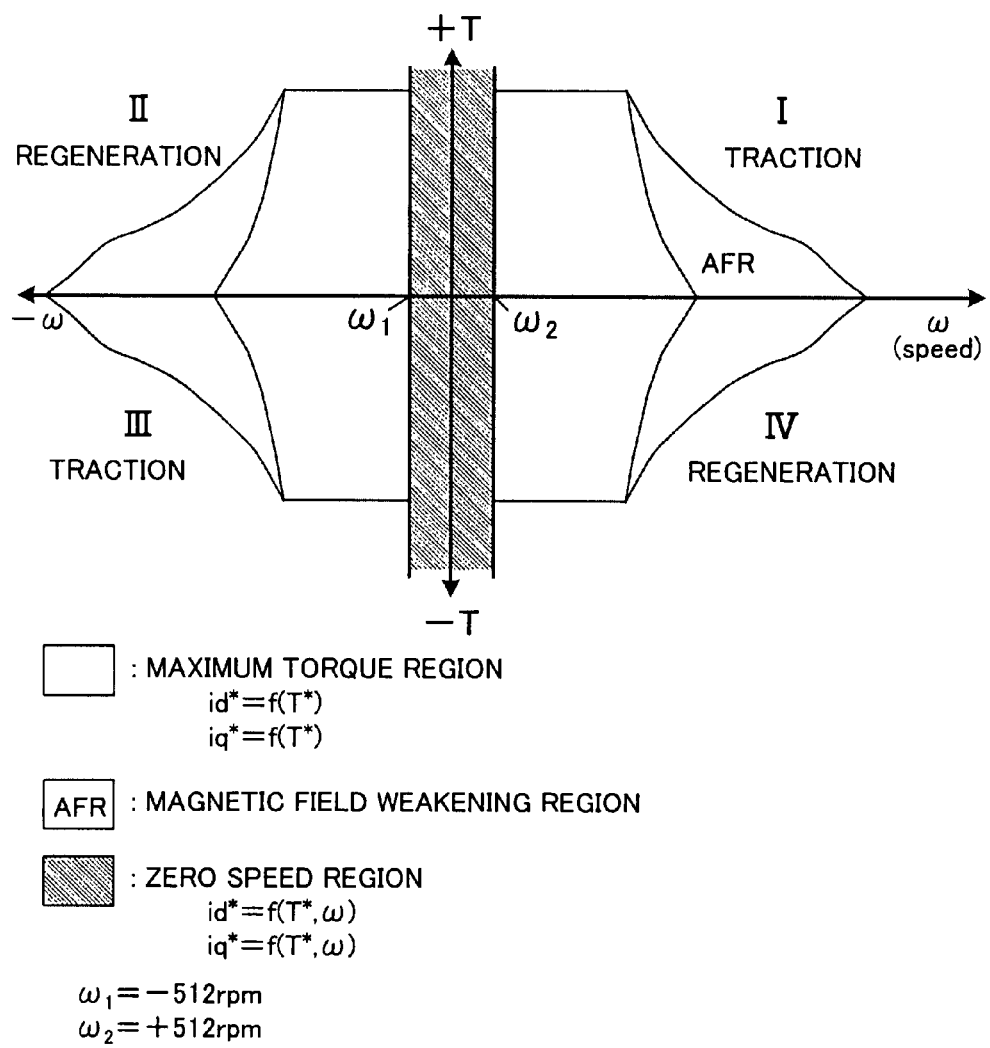
FIG. 6 is a graph showing a quadrant sections with respect to a generated torque and a rotation speed of the rotor, and a zero speed region as a predetermined speed region of the electric motor shown in FIG. 1.
Figure 7A:
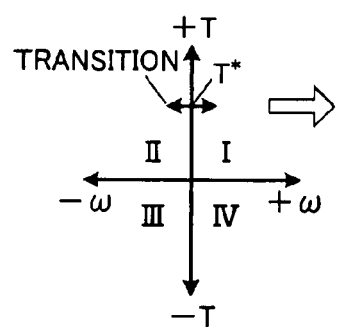
FIG. 7A is a graph showing a direction of a quadrant transition where a positive target torque value is given.
Figure 7B:
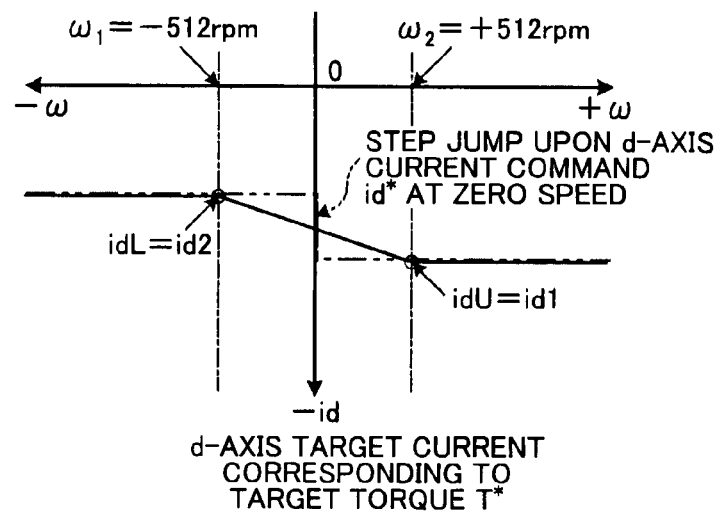
FIG. 7B is a graph representing a d-axis target current by a diagonal line, which is set when the quadrant transition occurs and the rotation speed of the electric motor is equal to or higher than −512 rpm and is equal to or lower than +512 rpm.
Figure 8A:
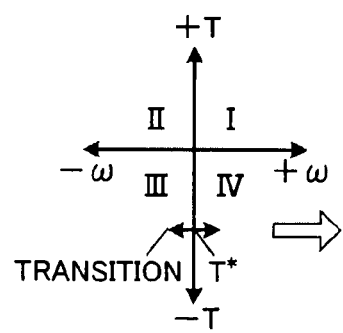
FIG. 8A is a graph showing the direction of the quadrant transition where the negative target torque value is given.
Figure 8B:
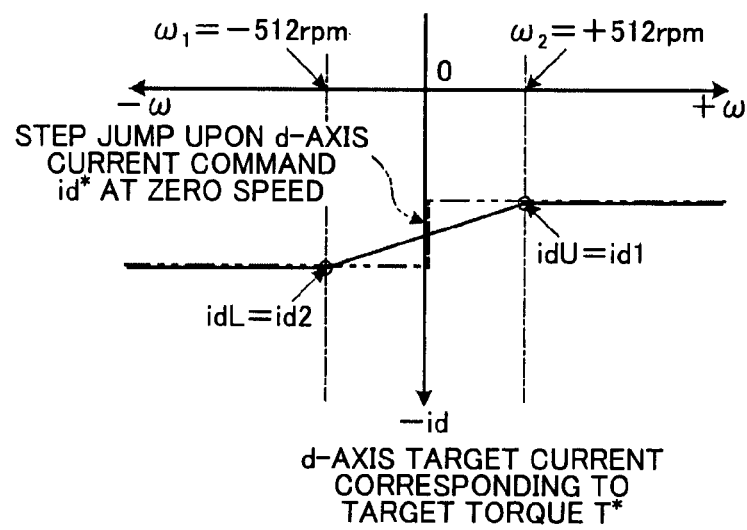
FIG. 8B is a graph representing the d-axis target current by the diagonal line, which is set when the quadrant transition occurs and the rotation speed of the electric motor is equal to or higher than −512 rpm and is equal to or lower than +312 rpm.
Figure 9A:
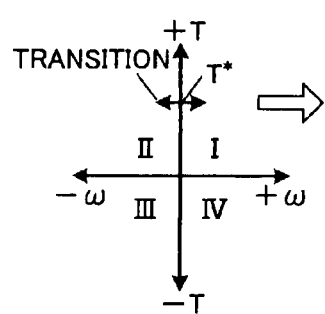
FIG. 9A is a graph showing the direction of the quadrant transition where the positive target torque value is given.
Figure 9B:
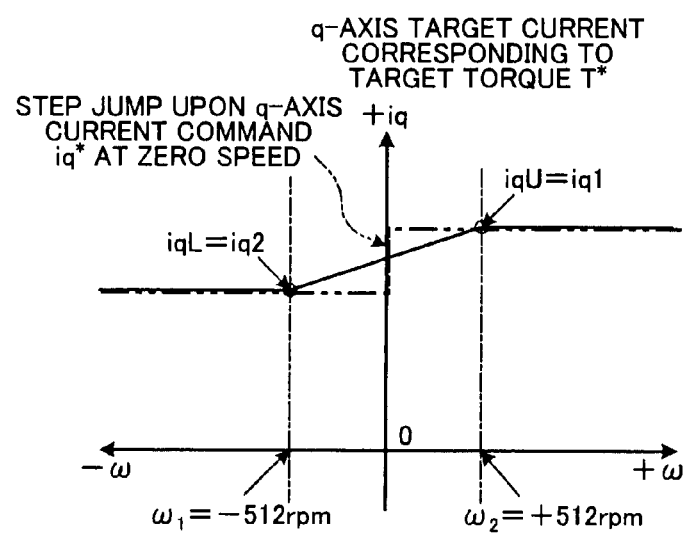
FIG. 9B is a graph representing the q-axis target current by the diagonal line, which is set when the quadrant transition occurs and the rotation speed of the electric motor is equal to or higher than −512 rpm and is equal to or lower than +512 rpm.
Figure 10A:
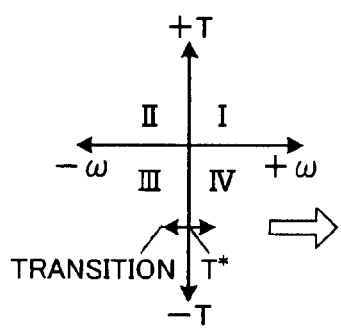
FIG. 10A is a graph showing the direction of the quadrant transition where the negative target torque value is given.
Figure 10B:
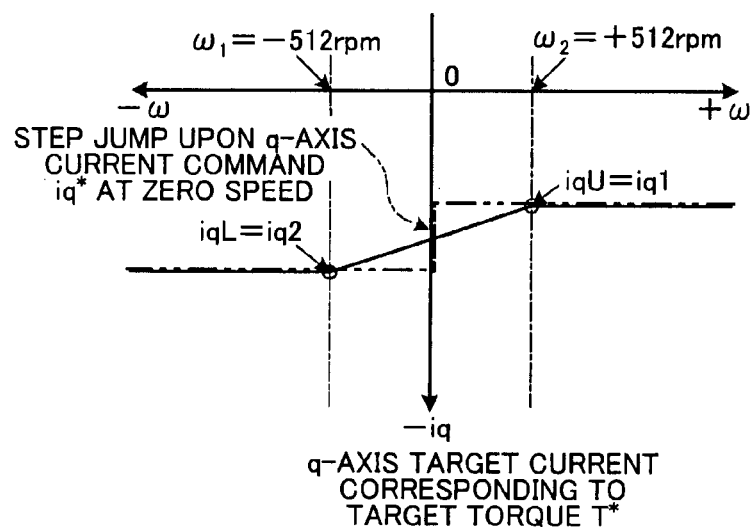
FIG. 10B is a graph representing the q-axis target current diagonal line, which is set when the quadrant transition occurs and the rotation speed of the electric motor is equal to or higher than −512 rpm and is equal to or lower than +512 rpm.

When the zero speed region defined by the following relationship is set to the predetermined speed region, and the motor speed is in the region as shown in FIG. 6 for example, the value obtained by the linear interpolation is set to the target current (for example id*, iq*) as the solid diagonal lines in FIGS. 7A to 10B show.

$\omega_1 \leq$ motor speed $\omega \leq \omega_2$, $\omega_1 = -512$ rpm, $\omega_2 = +512$ rpm This makes it possible to prevent the step jump (FIGS. 13 to 16) in the target current (id*, iq*) in spite of the quadrant transition between traction and regeneration.

Specifically, while the rotation speed (for example ω) of the electric motor is in the predetermined speed region (for example $\omega_1 \leq \omega \leq \omega_2$), the linear (continuous) transition of the target current (for example id*, iq*) is observed accompanied with the change in the rotation speed (for example ω). Even if the motor rotation speed passes the rotation speed 0 (for example ω=0) at which the target current (for example id*, iq*) for driving the motor allocated to the target torque (for example T*) is discontinuously switched in the predetermined speed region, actually the continuous transition of the target currents (for example id*, iq*) is observed, thus hardly generating the torque shock. If the electric motor is used for driving the vehicle to travel, the "hill climbing" without causing the vibration may be achieved.

The motor current (for example id, iq) for generating the same torque takes various values (for example, see a single dashed curve in FIG. 5: constant torque curve). The current value as the lowest power consumption current value (minimum current value) is selected from the aforementioned values so as to be applied to the electric motor. The resultant motor drive efficiency becomes high, that is, the power consumption efficiency is high. The curve obtained by plotting the minimum current values (highest efficiency points) on the constant torque curve of the respective target torque values is formed as the "high efficiency torque curve". When the motor is energized taking the current value (id, iq) at the position (point) of the given target torque (for example T*) on the high efficiency torque curve as the target current value, the power consumption efficiency for driving the motor becomes high.

In the embodiment, when the rotation speed (for example ω) of the electric motor (for example 10) is out of the predetermined speed range, the target current (for example id*, iq*) is determined based on the "high efficiency torque curve". This may allow the power for driving the motor to be consumed with high efficiency.

In the subsequent embodiment, the "high efficiency torque curve" is divided into two sections, that is, a high efficiency torque curve A that represents the d-axis target current and a high efficiency torque curve B that represents the q-axis target current. Each of the high efficiency torque curves A and B is further divided into sections for traction and regeneration.

As the magnetic field of the permanent magnet of the rotor is weakened by the weakening field current (for example Δid, Δiq), the inverted induced voltage generated through the rotation of the rotor is reduced. This allows the electric motor to be driven at high speeds by reducing the output torque at the high speeds.

According to an exemplary aspect of the invention, in an electric motor drive control method for deriving d-axis and q-axis target currents (for example id*, iq*) from a target torque (for example T*) to apply electric current (for example iU, iV, iW) corresponding to the target currents (for example id*, iq*) to an electric motor (for example 10), when a rotation speed (for example ω) of the motor is in a predetermined speed region (for example $\omega_1 \leq \omega \leq \omega_2$) including a zero rotation speed (for example ω=0) at which the target current (for example id*, iq*) for driving the motor allocated to the target torque (for example T*) is switched discontinuously, the d-axis target current (for example id*) corresponding to the rotation speed (for example ω) is obtained through a linear interpolation using the rotation speed and d-axis target currents at a traction side (for example idU) and a regeneration side (for example idL) allocated to the target torque (for example T*) given on a first high efficiency torque curve (for example A) that represents the d-axis target currents for generating the target torques with minimum power consumption, and the q-axis target current (for example iq*) corresponding to the rotation speed (for example ω) is obtained through a linear interpolation using the rotation speed and q-axis target currents at the traction side (IqU) and the regeneration side (for example IqL) allocated to the target torque (for example T*) given on a second high efficiency torque curve (for example B) that represents the q-axis target currents for generating the target torques with the minimum power consumption such that current (for example iU, iV, iW) corresponding to the d-axis and the q-axis target currents (for example id*, iq*) is applied to the electric motor (for example 10).

According to an exemplary aspect of the invention, an electric motor drive control system that includes a target current setting unit (for example 33-36, 40-42) for deriving a target current (for example id*, iq*) from a target torque (for example T*), a current application command unit (for example 37, 38) for generating a current application command (for example VU*, VV*, VW*) to apply electric current (for example iU, iV, iW) corresponding to the target current (for example id*, iq*) to an electric motor (for example 10), and a motor energizing unit (for example 50, 17-20) for applying energizing current to the electric motor based on a command of the current application command unit is characterized in that the target current setting unit (for example 33-36, 40-42) includes a target value correction unit (for example 35, 36) for deriving a target current (for example id*, iq*) corresponding to a rotation speed (for example ω) through a linear interpolation using the rotation speed (for example ω) and target currents at a traction side (for example idU, iqU) and a regeneration side (for example idL, iqL) each allocated to the target torque (for example T*) that has been given when the rotation speed (for example ω) of the motor is in a predetermined speed region (for example $\omega_1 \leq \omega \leq \omega_2$) including a zero rotation speed (for example ω=0) at which the target current (for example id*, iq*) for driving the motor allocated to the target torque (for example T*) is switched discontinuously.

According to an exemplary aspect of the invention, an electric motor drive control system that includes a target current setting unit (for example 33-36, 40-42) for deriving d-axis and q-axis target currents (for example id*, iq*) from a target torque (for example T*), a current application command unit (for example 37, 38) for generating a current application command (for example VU*, VV*, VW*) to apply electric current (for example iU, iV, iW) corresponding to the target current (for example id*, iq*) to an electric motor (for example 10), and a motor energizing unit (for example 50, 17-20) for applying energizing current to the electric motor based on a command of the current application command unit is characterized in that the target current setting unit (for example 33-36, 40-42) includes a first high efficiency torque curve table (for example A) that holds the respective d-axis target currents for generating the target torques of the electric motor with minimum power consumption, a second high efficiency torque curve table (for example B) that holds the respective q-axis target currents for generating the respective target torques of the electric motor with the minimum power consumption, and a target value correction unit (for example 35, 36) that derives the d-axis target current (for example 34 shown in FIG. 4) corresponding to a rotation speed through a linear interpolation using the rotation speed and the d-axis target currents at a traction side and a regeneration side each allocated to the target torque that has been given on the first high efficiency torque curve table (for example A), and derives the q-axis target current (for example 37 shown in FIG. 4) corresponding to the rotation speed through a linear interpolation using the rotation speed and the q-axis target currents at the traction side and the regeneration side each allocated to the target torque that has been given on the second high efficiency torque curve table (for example B) when the rotation speed of the motor is in a predetermined speed region including a zero rotation speed at which the target current for driving the motor allocated to the target torque is switched discontinuously.

What is claimed is:

1. An electric motor drive control method, comprising:
   deriving a target current from a target torque to apply electric current corresponding to the target current to an electric motor, wherein:
   when a rotation speed of the motor is in a predetermined speed region, including a zero rotation speed at which the target current for driving the motor allocated to the target torque is switched discontinuously, the target current corresponding to the rotation speed is obtained through a linear interpolation using the rotation speed and target currents at a traction side and a regeneration side allocated to the target torque such that the electric current corresponding to the target current is applied to the motor, and
   when the rotation speed of the motor is out of the predetermined speed region, the motor is subjected to the electric current corresponding to the target current that is determined based on the target torque on a high efficiency torque curve that represents respective target currents for generating respective target torques of the motor with minimum power consumption.

2. The electric motor drive control method according to claim 1, wherein:
   a weakening magnetic field current is derived based on a power source voltage for supplying power to the motor and a target voltage corresponding to the target current, and
   the motor is subjected to the electric current corresponding to a value obtained by subtracting a derived weakening magnetic field current from the target current allocated to the value corresponding to the target torque given on the high efficiency torque curve.

3. The electric motor drive control method according to claim 1, wherein when the rotation speed of the motor is in the predetermined speed region, a difference in the target currents between the traction side and the regeneration side corresponding to the target torque is multiplied with a ratio of a difference between an upper limit of a positive speed and a lower limit of a negative speed in the predetermined speed region to a difference between the rotation speed of the motor and the lower limit of the negative speed on the high efficiency torque curve such that the motor is subjected to the electric current corresponding to a value obtained by adding the multiplied value to the target current at the regeneration side.

4. The electric motor drive control method according to claim 1, wherein when the rotation speed of the motor is in the predetermined speed region, a difference in the target currents between the traction side and the regeneration side corresponding to the target torque is multiplied with a ratio of a difference between an upper limit of a positive speed and a lower limit of a negative speed in the predetermined speed region to a difference between the rotation speed of the motor and the upper limit of the positive speed on the high efficiency torque curve such that the motor is subjected to the electric current corresponding to a value obtained by subtracting the multiplied value from the target current at the traction side.

5. The electric motor drive control method according to claim 1, wherein:

the high efficiency torque curve includes a first high efficiency torque curve representing respective d-axis target currents for generating the respective target torques of the motor with minimum power consumption, and a second high efficiency torque curve representing respective q-axis target currents for generating the respective target torques at respective weakening magnetic field currents of the motor with the minimum power consumption, and the d-axis target current is obtained based on the first high efficiency torque curve and the q-axis target current is obtained based on the second high efficiency torque curve, respectively.

6. The electric motor drive control method according to claim 1, wherein the motor is a vehicle mount electric motor that is installed in the vehicle for driving wheels of the vehicle to be rotated.

7. An electric motor drive control method, comprising:
   deriving d-axis and q-axis target currents from a target torque to apply electric current corresponding to the target currents to an electric motor, wherein:
   when a rotation speed of the motor is in a predetermined speed region including a zero rotation speed at which the target current for driving the motor allocated to the target torque is switched discontinuously, the d-axis target current corresponding to the rotation speed is obtained through a linear interpolation using the rotation speed and d-axis target currents at a traction side and a regeneration side allocated to the target torque given on a first high efficiency torque curve that represents the d-axis target currents for generating the target torques with minimum power consumption; and
   the q-axis target current corresponding to the rotation speed is obtained through a linear interpolation using the rotation speed and q-axis target currents at the traction side and the regeneration side allocated to the target torque given on a second high efficiency torque curve that represents the q-axis target currents for generating the target torques with the minimum power consumption such that current corresponding to the d-axis and the q-axis target currents is applied to the motor.

8. The electric motor drive control method according to claim 7, wherein the motor is a vehicle mount electric motor that is installed in the vehicle for driving wheels of the vehicle to be rotated.

9. An electric motor drive control system, comprising a controller that:
   derives a target current from a target torque,
   generates a current application command to apply electric current corresponding to the target current to an electric motor,
   applies energizing current to the motor based on a command of the current application command unit, and
   derives a target current corresponding to a rotation speed through a linear interpolation using the rotation speed and target currents at a traction side and a regeneration side each allocated to the target torque that has been given when the rotation speed of the motor is in a predetermined speed region including a zero rotation speed at which the target current for driving the motor allocated to the target torque is switched discontinuously, wherein the controller:
   includes a high efficiency torque curve table that holds the target currents for generating the target torques of the motor at minimum power consumption; and sets a current with respect to the target torque on the high efficiency torque curve table to the target current when the rotation speed of the motor is out of the predetermined speed region.

10. The electric motor drive control system according to claim 9, wherein the controller:
    derives a weakening magnetic field current based on a power source voltage for supplying power to the motor and a target voltage corresponding to the target current; and
    corrects the target current to a value obtained by subtracting a value corresponding to a weakening magnetic field current from the target current read from the high efficiency torque curve table.

11. The electric motor drive control system according to claim 9, wherein the controller derives the target current by adding a value obtained by multiplying a difference in target currents between the traction side and the regeneration side corresponding to the target torque on the high efficiency torque curve by a ratio of a difference between an upper limit of a positive speed and a lower limit of a negative speed in the predetermined speed region to a difference between the rotation speed of the motor and the lower limit of the negative speed to the target current at the regeneration side when the rotation speed of the motor is in the predetermined speed region.

12. The electric motor drive control system according to claim 9, wherein the controller derives the target current by subtracting a value obtained by multiplying a difference in target currents between the traction side and the regeneration side corresponding to the target torque on the high efficiency torque curve by a ratio of a difference between an upper limit of a positive speed and a lower limit of a negative speed to a difference between the rotation speed of the motor and the upper limit of the positive speed from the target current at the traction side when the rotation speed of the motor is in the predetermined speed region.

13. The electric motor drive control system according to claim 9, wherein the controller:
    includes a first high efficiency torque curve table representing respective d-axis target currents for generating the respective target torques of the motor with minimum power consumption, and a second high efficiency torque curve table representing respective q-axis target currents for generating the respective target torques at the respective weakening magnetic field currents of the motor with the minimum power consumption; and
    derives the d-axis target current and the q-axis target current based on the first and the second high efficiency torque curves, respectively.

14. The electric motor drive control system according to claim 9, wherein the motor is a vehicle mount electric motor that is installed in the vehicle for driving wheels of the vehicle to be rotated.

15. An electric motor drive control system, comprising:
    a controller that:
        derives d-axis and q-axis target currents from a target torque,
        generates a current application command to apply electric current corresponding to the target current to an electric motor,
        applies energizing current to the motor based on the current application command, wherein:
    the controller includes a first high efficiency torque curve table that holds the respective d-axis target currents for generating the respective target torques of the motor with minimum power consumption, a second high efficiency torque curve table representing the respective q-axis target currents for generating the respective target torques of the motor with the minimum power consumption,
    the controller derives the d-axis target current corresponding to a rotation speed through a linear interpolation using the rotation speed and the d-axis target currents at a traction side and a regeneration side each allocated to the target torque that has been given on the first high efficiency torque curve table, and
    the controller derives the q-axis target current corresponding to the rotation speed through a linear interpolation using the rotation speed and the q-axis target currents at the traction side and the regeneration side each allocated to the target torque that has been given on the second high efficiency torque curve table when the rotation speed of the motor is in a predetermined speed region including a zero rotation speed at which the target current for driving the motor allocated to the target torque is switched discontinuously.

16. The electric motor drive control system according to claim 15, wherein the motor is a vehicle mount electric motor that is installed in the vehicle for driving wheels of the vehicle to be rotated.

* * * * *